United States Patent [19]

Farag et al.

[11] 4,447,858
[45] May 8, 1984

[54] RIGID SUBCHASSIS STRUCTURE FOR MOTOR CONTROL CENTER OR THE LIKE

[75] Inventors: Samir F. Farag; Alvin R. Hoffmann; John D. Kleinecke, all of Wichita Falls, Tex.

[73] Assignee: Siemens-Allis, Inc., Atlanta, Ga.

[21] Appl. No.: 373,029

[22] Filed: Apr. 28, 1982

[51] Int. Cl.³ .............................................. H02B 1/04
[52] U.S. Cl. .................................. 361/429; 339/45 M; 361/339; 361/391; 200/50 AA
[58] Field of Search .................... 339/45 R, 45 M; 200/50 AA; 361/335–343, 345, 390, 391, 429

[56] References Cited

U.S. PATENT DOCUMENTS

| | | | |
|---|---|---|---|
| 3,005,064 | 10/1961 | Baird | 200/50 AA |
| 3,896,353 | 7/1975 | Burton | 361/339 |
| 4,051,334 | 9/1977 | Ericson | 361/339 |

*Primary Examiner*—G. P. Tolin
*Attorney, Agent, or Firm*—John L. James

[57] ABSTRACT

A cabinet enclosing high voltage electrical apparatus is formed of a deformable, alignable framework made of structural steel or the like, and comprises at least one compartment for receiving a contactor carriage assembly. A rigid subchassis is separately constructed and mounted within each cubicle. The subchassis forms a high-integrity structure which supports and engages the contactor carriage, and maintains alignment of interengaging parts despite distortions of the cabinet framework.

8 Claims, 3 Drawing Figures

RIGID SUBCHASSIS STRUCTURE FOR MOTOR CONTROL CENTER OR THE LIKE

BACKGROUND OF THE INVENTION

The present invention relates to electric motor control centers and the like, and more particularly to an improved construction for an enclosure which receives a removable contactor carriage.

It is conventional for equipment used for stopping, starting, and controlling the operation of large electric motors to be housed in sheet metal cabinets. Such apparatus ordinarily includes a contactor which opens and closes the main load circuit, and auxiliary control equipment such as cutout relays, current transformers, overload relays, etc. Such equipment is usually intended to both protect electric motors against short circuit or overcurrent conditions, while allowing large currents to flow during startup and temporary overload conditions. The actual apparatus which opens and closes the load circuit, and which is therefore called upon to make and break large currents, is usually contained in a separate cubicle which is physically isolated from other compartments which contain control units which typically operate at much lower voltage levels.

Both because of its size and because of the need for inspection and repair, the large, heavy electromechanical contactors are conventionally incorporated into a removable unit, herein termed a carriage. In many cases the carriages are provided with wheels so they may be rolled in and out of their compartment; in other cases rollers are provided within the compartment to ease the egress of the contactor carriage. The carriage is provided with means for engaging the large, heavy conductors which conduct current from the supply line to the contactor and from the contactor to a load. Due to the heavy currents involved, the engaging elements are necessarily of substantial construction and ordinarily take the form of a female element such as a set of spring-loaded fingers attached to the contactor carriage and a male element, termed a "stab" and ordinarily formed of a heavy copper bar, which extends from the base or back wall of the compartment. Since most heavy electrical installations utilize three-phase power, a total of six sets of stabs and fingers are provided. Due to their necessary rigidity and size, they must be maintained in precise alignment with one another. They must also be properly aligned with respect to the contactor carriage so that all connections are made properly, without gaps which could give rise to arcing.

For the foregoing reasons it is necessary that the means which locate and engage the contactor carriage be of the highest structural integrity, since a small amount of flexure could result in substantial misalignment and make it difficult or impossible to properly install or "rack" the carriage assembly.

Due to the relatively large size of the cabinets which contain the motor control center equipment a good deal of deformation and misalignment necessarily occurs if the cabinets are not handled with some care and mounted upon flat, level surfaces. In order to provide the structures with sufficient rigidity to maintain their internal dimensions, the framework is often fabricated of heavy structural members which are welded together into a monolithic frame, then covered with sheet metal panels. This approach results in a structure which is a good deal heavier and more expensive than necessary for supporting the cabinet during normal use. In addition even with heavy, rugged construction the cabinet may be badly distorted by improper lifting or handling, or installation upon uneven surfaces. It will therefore be appreciated that it would be highly beneficial to provide a form of motor control center construction which accommodates an economical structural framework susceptible to some deformation and misalignment but adequately strong for in-place support, while maintaining the structural relationships among the removable, interengaging high-current elements within the cabinet.

It is therefore an object of the invention to provide a motor control center construction which tolerates substantial structural deformation and misalignment yet allows the ready engagement and disengagement of a contactor carriage assembly.

Another object is to provide rigid means for locating a contactor carriage assembly within a motor control center compartment whose geometry is substantially unaffected by common forms of deformation and misalignment of the enclosing structure.

Yet another object is to provide rigid, independent structure within a motor control center cabinet which maintains the relative alignment among current engaging elements, contactor carriage assembly, and racking mechanism.

Yet another object of the invention is to provide a separable structure to be carried within a motor control center compartment which provides for the proper location of interlock and racking mechanisms and current-carrying elements with respect to a separable contactor carriage assembly.

SUMMARY OF THE INVENTION

Briefly stated, in accordance with one aspect of the invention the foregoing objects are achieved by providing a rigid subchassis including a generally horizontal guide plate having an extended, planar central section and upturned opposing edges which form guides for receiving a contactor carriage assembly. Means are provided at the front and back ends of the guide plate for securing the plate to an underlying framework, such as the frame of a motor control center cabinet. A pair of upstanding angle members are bolted to the upstanding edges near the back end of the guide plate and provided with a cross member which supports current-carrying contactor-engaging members such as fingers or stabs. A rotatable cross shaft is secured transverseley between the upright angle members near the guide plate, and provided with arms or the like which engage a contactor carriage assembly. Another arm on the end of the cross shaft is coupled to a bellcrank mounted on a rigid bracket which is in turn secured to one side of the guide plate so that forces resulting from the racking or unracking of a contactor carriage are contained with the subchassis. In one presently preferred embodiment a manually-operated handle is mounted upon the enclosure framework, and linked to the bellcrank by means of a pushrod. In another embodiment, the handle is mounted upon a rigid, upright member which is also affixed to the guide plate so that the entire guide plate and racking mechanism can be assembled, then inserted into a motor control center compartment.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
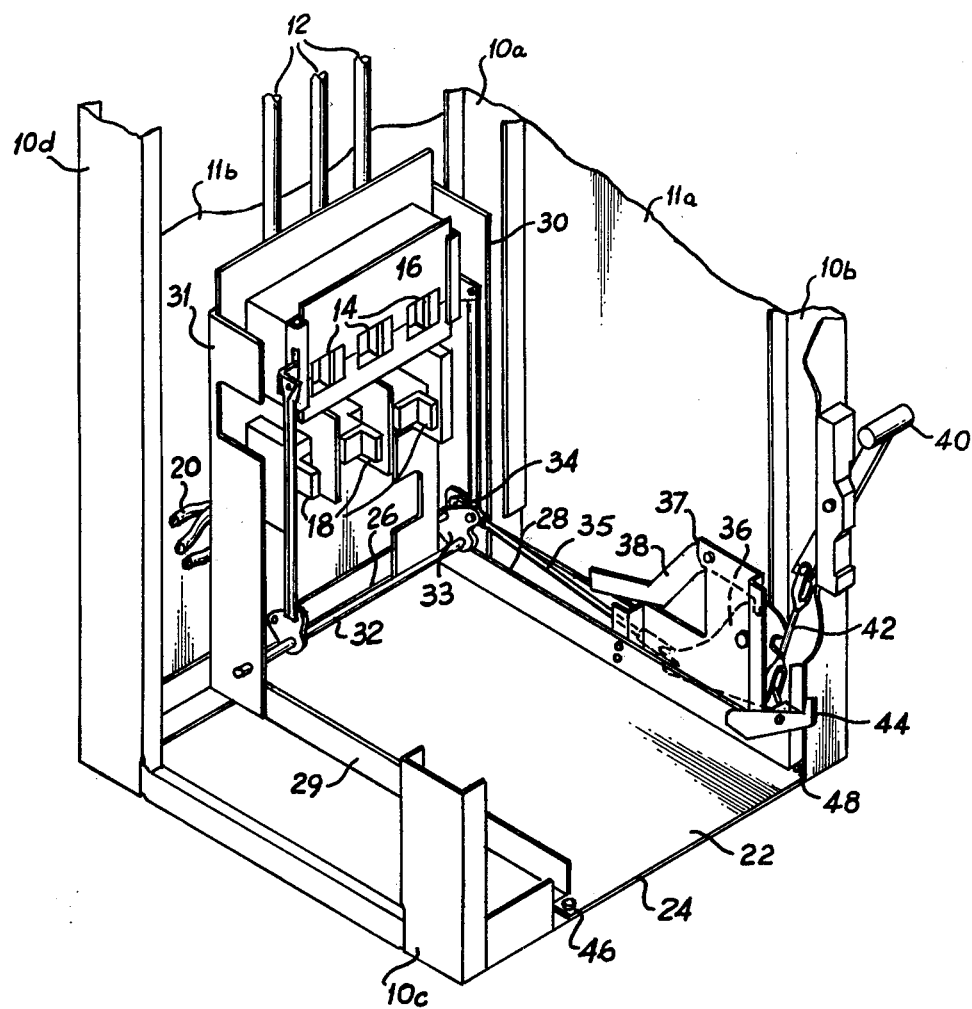
FIG. 1 is an oblique view of a cutaway motor control center, showing elements of the construction thereof.

FIG. 1 shows in cutaway form a motor control center structure constructed in accordance with the present invention, and adapted to receive a removable contactor carriage assembly (not shown). As is conventional the elements of the cabinet structure are formed by a skeleton-like assemblage of steel elements, in the present case including upright steel channels 10a–10d. The channels are coupled at their lowermost ends by a series of angle members, partly visible in the Figure. That the uppermost ends of the channels, and at points along their length, are connected by other structural elements such as angles or channels. The sides and back of the cabinet are closed in conventional fashion by sheet metal panels 11a and 11b, the panels covering the near side and the door for the enclosure having been removed for purposes of illustration. Incoming power is supplied to the enclosure by means of bus bars 12 which may be of round, tubular or rectangular construction. Such bars are conventionally supported on insulators in the rear of the cabinet so that they are relatively inaccessible, and not exposed to maintenance personnel. The "line" power is conducted to a set of three connector elements here depicted as stabs 14 which are visible through openings in an insulative shutter member 16 which has been raised in order to allow access to the stabs. A second set of stabs 18, located below the first set, are electrically connected to the motor by bus bars or by cables 20. Stabs 18 are not enclosed inasmuch as they are only energized when the contactor carriage is racked into place in the compartment.

Owing to the relatively large size of the motor control center and the inherent deformability and misalignability of its structure, particularly when called upon to bear the weight of apparatus mounted within it, the present inventors have provided a separable, internal subchassis for receiving a contactor carriage assembly. The subchassis comprises a generally flat, planar guide plate 22 which has a forward edge 24 and a rearmost edge 26. The two lateral edges of guide plate form upwardly-extending edges 28 and 29 for purposes to be more fully explained hereinafter. At the rear edge of each of the upper-turned edges there is mounted an upstanding angle member 30, 31 which serves as a support for Stabs 14, 18 and locates them with respect to guide plate 22, and therefore to the contactor carriage assembly.

Near the intersection of the angle members and guide plate there is located a rotatable cross shaft 32 which is provided with means such as arms and pins 33 which engage mating slots in the contactor carriage, urging the carriage rearwardly into the compartment until it is fully "racked" or engaged, with stabs 14 and 18. Shaft 32 is rotated by means of an arm 34 engaged by a pushrod 35. The pushrod is in turn urged to and fro by a bellcrank 36 affixed to a rigid bracket 37 which is mounted at one side of the guide plate. An interlock lever 38 is also mounted to the bracket, and interacts with the carriage assembly to prevent operation of the bellcrank when the contactor is closed.

A manually-operable handle 40 is pivotally mounted to frame member 10B and serves to rotate bellcrank 36 by means of a pushrod 42. In order to prevent accidental removal of the contactor carriage, particularly if a carriage of the wheeled type is used, a latch 44 is pivotally mounted to one side of the guide plate assembly so that in the position shown it blocks the egress of the carriage.

As stated above, only the guide plate itself is attached to the control center cabinet framework. In this case, a pair of laterally-extending tabs 46, 48 formed by extensions of the forward edge of the guide plate are attached to the framework by means of bolts. In a presently preferred embodiment the rear edge is similarily attached to the framework by means of bolts (not shown).

Upon gaining of familiarity with the construction just described, it will be understood that the long vertically-extending structural members are prone to deform and move back and forth in a horizontal direction as uneven loading is applied to the overall structure, such as by improper lifting or handling, or by placing the structure on an uneven surface. Rather than attempt to increase the structural rigidity of the skeletal members, the present inventors have instead provided an internal subchassis which maintains its structural integrity despite the deformation and misalignment of the surrounding structure. In particular, it will be understood that by attaching only guide plate 22 to the horizontal structural members of the framework, the upstanding angle members 30, 31 are substantially unattached to the supporting structure. There will inevitably be some indirect connection with the cabinet structure, such as by means of bus bars 12 and the like; however it is anticipated that all such auxiliary connections will be far more flexible than the subchassis structure, so that deformation and misalignment of the cabinet will not cause any meaningful deformation or misalignment of angle members 30, 31 with respect to guide plate 22.

Because of the structural relationships outlined above, the relative position of stabs 14, 18 with respect to the surface of guide plate 22 and to the upstanding lateral edges 28, 29 is maintained. Further, the relationship of these elements with respect to the racking mechanism, particularly cross shaft 32, is maintained constant so that even if the cabinet frame is severally twisted or misaligned a contactor carriage may be inserted into the rigid subchassis and maintain proper alignment with all of the stabs and the racking mechanism. A further benefit of this construction is that most of the racking mechanism is carried directly by the subchassis structure. In particular, it will be noted that bellcrank 36, pushrod 35 and cross shaft 32 are all borne by the same subchassis structure so that forces exerted upon the carriage in racking or unracking it are exerted against the cross shaft 32 and the pivot point of bellcrank 36. Hence the operation of the racking mechanism is unaffected by the misalignment of the rigid subchassis in the surrounding cabinet. In this embodiment handle 40 is affixed to the outer framework and is coupled to bellcrank 36 by means of a pivoted rod 42. The junctures of rod 42 with handle 40 and bellcrank 36 are sufficient to accommodate any misalignment which may occur between the subchassis and the outer frame.

In use, an operator simply opens the door (not shown) which allows access to the front edge of the guide plate and places the carriage assembly on the guide plate, pushing it in until it engages the arms 33 extending from cross shaft 32. It will be noted that this means of coupling a contactor carriage to a rotatable racking mechanism is conventional and has been used for a number of years by manufacturers of motor control centers. Handle 40 is then pushed upwardly toward the "on" position shown in FIG. 1. This urges bellcrank 36 about in a clockwise manner, pushing rod 35 toward the rear of the compartment and rotating cross shaft 32. This draws the carriage rearwardly into the cubicle, forcing its contact members, which may be spring-loaded fingers, into firm engagement with stabs 14 and 18. The rearwardly-directed force is borne by the upstanding angles 30, 31. The force is transmitted to the lateral or upstanding edges 28, 29 by means of bolts or similar mounting means.

In the case of carriages supported on wheels, as the carriage enters the guide plate the wheels engage the lower edge of latch 44, rotating the latch clockwise against the force of a spring or, in a preferred embodiment, simply against the weight of the innermost end of the latch. After the wheels pass under the latch, the latch drops back into the position shown where it blocks the wheel from rolling out of the enclosure unless the latch is moved out of the way by manually depressing its outer end. Means extending from the carriage and movable in concert with the contactor engages interlock lever 38 and prevents operation of the bellcrank when the contactor is energized.

Figure 2:
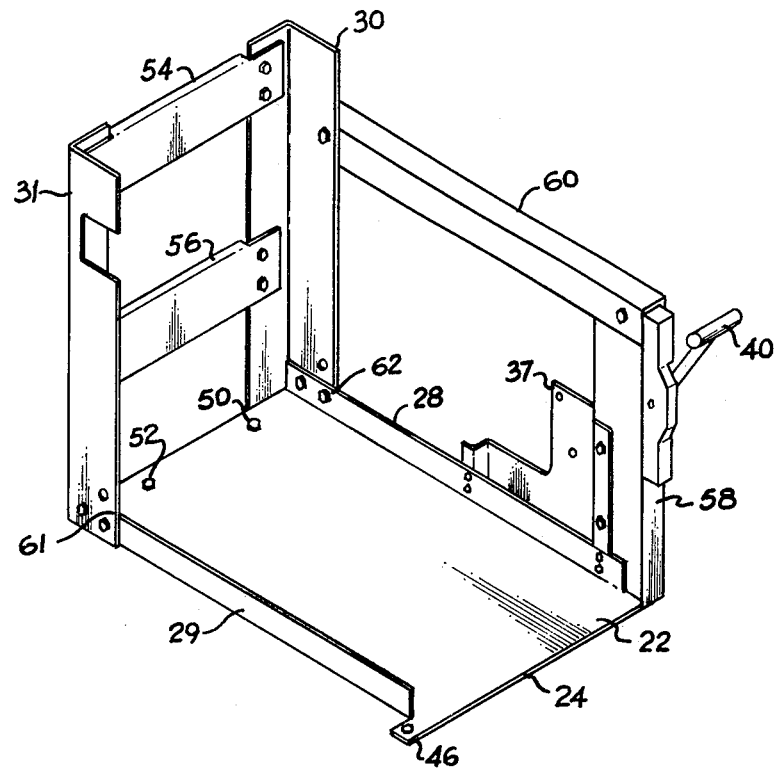
FIG. 2 is an oblique view of an internal structure of the apparatus of FIG. 1 constructed in accordance with the present invention.

Referring now to FIG. 2, there is shown in further detail the basic construction of the rigid subchassis of FIG. 1, further illustrating an embodiment wherein the racking mechanism may be self-contained within the subchassis structure. In this illustration a pair of holes 50, 52 are evident which are placed near the rear edge of the guide plate for accommodating bolts which secure the rear edge to the cabinet framework. A pair of cross members 54, 56 are shown extending between the upstanding angle members 30, 31 for securing the angle members in place relative to one another and also for supporting the insulative members which carry stabs 14 and 18. Cross members 54 and 56 further assure the structural integrity of the system, and therefore the consistent and reliable engagement of all stabs by the contactor carriage.

As is known to those familiar with motor controls, some suppliers of control center equipment are primarily engaged in the construction of cabinets and panels, purchasing the control equipment, contactors, and carriage assemblies from other manufacturers. There is therefore a market for ready-made insertable structures which can be fitted within in a compartment and which will receive contactor carriage assemblies. Such structures have conventionally taken the form of cage-like cubicles which in effect reproduce the conventional support framework of a manufacture's cabinet, including mounting means for the contactor carriage assembly. In effect, such structures merely reproduce the already-present supporting structures by providing a cabinet manufacturer with an entire cubicle "skeleton" which can be inserted within his own structure. Such cubicles, which are typically of unitary welded design, are not only costly to manufacture and ship but are relatively large and cumbersome and occupy a good deal of space since they must be fitted within a preexisting redundant framework.

In the embodiment of FIG. 2, racking handle 40 is mounted on an upstanding channel member 58 which is secured to upstanding edge 28 of the guide plate, and to bracket 37. A strut 60 extends from angle member 30 to the upper end of channel 58 to provide further strength, and to resist forces arising when racking and unracking the carriage assembly by means of handle 40.

It is important to note that practically all of the elements of the illustrated subchassis assembly are fastened together by means of bolts rather than welding. This avoids the need for special jigs and fixtures to hold parts preparatory to welding, and also avoids the warpage which is often inherent in welding operations. More importantly, it allows all of the elements to be separately fabricated and stored in a factory area to be assembled only when needed. In this manner a large number of subchassis can be prefabricated and kept on hand in an assembly area, while occupying very little space.

In order to assure perfect alignment of the guide plate and angles, in some instances it may be desirable to align these elements by means of a fixture or the like for assembly, then assure permanent alignment by drilling holes through abutting surfaces and then driving pins such as those shown at 61, 62 through the sides of the angles and the guide plate.

Figure 3:
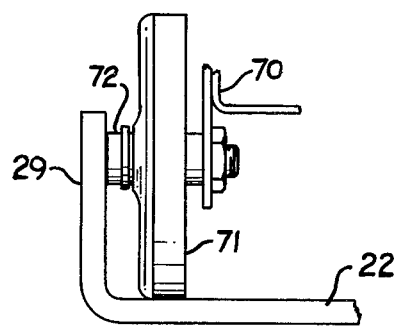
FIG. 3 illustrates the transverse location of a contactor carriage assembly within the structure of FIGS. 1 and 2.

FIG. 3 illustrates the manner of lateral location of the contactor carriage assembly within guide plate 22. Contactor carriage 70 is supported by wheels 71, which are in turn affixed to the carriage by means of stub axles 72. While it is conventional to locate the carriage by providing tracks or the like for the wheels, it has been found that unless relatively expensive, precision wheels are utilized good lateral location cannot be assured. Accordingly, the present inventors provide the guide plate with upstanding edge 29 which extends at least above the center line of axle 72. The length of the axle is easily controlled, as is the width of carriage 70. As a result, the dimension between the ends of opposite axles can be easily determined. At the same time, it has been found that the distance between the inner surfaces of upstanding edges 28 and 29 of the guide plate 22 can be controlled to a relatively high degree so that very accurate level location of the carriage can be provided by the relationship between the ends of the carriage axles and the inner surfaces of the upstanding guide plate edges.

It will now be understood that the present invention provides an economical, easily removable structure for receiving a contactor carriage assembly which is substantially unaffected by distortion of a surrounding cabinet, and which is easily assembled or shipped separately from the enclosure, so that the enclosure structure can be fabricated of lighter, more economical materials and to be assembled by means of bolted pre-formed members rather than welded into a solid structure.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A motor control center, comprising:

a deformable, alignable framework having vertical frame members and horizontal frame members enclosed by sheet material and including at least one compartment for receiving a contactor carriage assembly, a rigid subchassis for receiving said carriage assembly, said subchassis having a generally flat guide plate member mounted horizontally within said compartment, said guide plate member comprising an extended, generally flat lower section having front and back ends and opposed sides, upturned edge members extending at each of said sides for receiving and guiding said carriage assembly therein, and means at said front and back ends attaching said guide plate member to said horizontal frame members, said guide plate member being free of direct attachment to said vertical frame members;

a pair of upstanding angle members attached to said guide plate member adjacent to the back end thereof, one leg of each angle member extending parallel to said back end, the other leg extending parallel to and overlapping one of said upturned edge members;

means coupling each of said other legs of said angle members to the adjacent one of said upturned edge members of said guide plate member;

a cross member coupled between said angle members at a point spaced from the back edge of said guide plate member;

electrical connection means mounted to said cross member for engagement by said carriage assembly;

a rotatable cross shaft having opposed ends and carriage-engaging means extending therefrom, said opposed ends being supported at opposite sides of said subchassis; and a rigid bracket means rigidly affixed to one of said upturned edges and supporting at least a portion of a racking mechanism thereon for rotating said cross shaft.

2. The invention defined in claim 1, further including a bellcrank pivotally affixed to said bracket; and pushrod means linking said bellcrank means with said rotatable cross shaft.

3. The invention defined in claim 2, wherein opposed ends of said rotatable cross shaft are journaled in openings provided in said angle members.

4. The invention defined in claim 1, wherein said upturned edge members extend at least to the center lines of the axles of said carriage assembly for abutting said axle ends when said carriage assembly is received in said compartment.

5. The invention defined in claim 1, further including a plurality of bolts extending through said second legs of said angle members and adjacent upturned edge members for rigidly locating said angle members with respect to said guide plate member; and a metal pin fixedly extending through each of said legs and adjacent members.

6. The invention defined in claim 1, further including latch means for preventing the withdrawal of a carriage assembly from said subchassis, said latch means being pivotally attached adjacent one side of said guide plate member and extending within and generally parallel to one of said upturned edges, said latch means having a first end extending toward the back edge of said guide plate member and a second edge extending at least to the front edge thereof, said latch means being balanced such that said first end falls to a position in which it blocks the exit of said carriage assembly, whereby manual depression of said second end will raise said first end and allow egress of said carriage assembly.

7. The invention defined in claim 1, further including a second, upstanding bracket means extending on the same side of said guide plate member as said first bracket, said second bracket being substantially higher than said first bracket; bracing means extending from said second bracket to one of said angle members; handle means pivotally attached to said second bracket; and a second pushrod coupling said handle means to said bellcrank for operating said cross shaft.

8. The invention defined in claim 7, further including a second cross member extending between said angle members; and a second set of electrical connection means carried by said second cross member for engagement by said carriage assembly.

* * * * *